United States Patent
Stewart

(10) Patent No.: US 11,472,431 B1
(45) Date of Patent: Oct. 18, 2022

(54) VISUAL WARNING ASSEMBLY

(71) Applicant: David Mark Stewart, Lancaster, CA (US)

(72) Inventor: David Mark Stewart, Lancaster, CA (US)

(*) Notice: Subject to any disclaimer, the term of this patent is extended or adjusted under 35 U.S.C. 154(b) by 0 days.

(21) Appl. No.: 17/165,709

(22) Filed: Feb. 2, 2021

Related U.S. Application Data

(60) Provisional application No. 62/984,216, filed on Mar. 2, 2020.

(51) Int. Cl.
  *G08B 21/00* (2006.01)
  *B60W 50/14* (2020.01)
  *H04W 4/46* (2018.01)
  *B62J 50/22* (2020.01)

(52) U.S. Cl.
  CPC ............. *B60W 50/14* (2013.01); *B62J 50/22* (2020.02); *H04W 4/46* (2018.02); *B60W 2050/146* (2013.01)

(58) Field of Classification Search
  CPC .. B60R 1/04; B60R 11/04; B60R 1/00; B60R 1/06; B60R 1/12; B60R 2001/1215; B60R 2001/1223; B60R 2001/1253; B60R 2001/1269; B60R 2011/0033; B60R 2300/105; B60R 2300/308; B60R 2300/8026; B60R 2300/8066; B60R 2300/808; B60R 2300/8093; B60R 1/082; B29C 45/0017; B29C 45/14639; B29C 45/14754; B29C 45/1671; B29L 2011/0058; B29L 2031/30; B60C 9/00; B60Q 9/008; B60Q 9/00; G06T 2207/10016; G06T 2207/30232; G06T 2207/30261; G06T 7/13; G06T 7/70; G06V 20/58; G08G 1/165; G08G 1/166; G08G 1/167; G09G 2300/023; G09G 2300/0456; G09G 2340/12; G09G 2380/10; G09G 3/001; G09G 3/346; G09G 5/026;

(Continued)

(56) References Cited

U.S. PATENT DOCUMENTS 6,147,608 A * 11/2000 Thacker ................... G08B 7/06
  340/331
9,564,041 B1 * 2/2017 Dedeaux ............. G08B 25/009

(Continued)

*Primary Examiner* — Daniel Previl
(74) *Attorney, Agent, or Firm* — Plager Schack LLP; Mark H. Plager; Michael J. O'Brien

(57) ABSTRACT

A visual warning assembly, configured to make a warning from one vehicle to another vehicle. The visual warning assembly has a case with a front face joined to a base and an antenna. A channel display window, a channel selector button, a power button, a green lighted button, a yellow lighted button and a red lighted button, arranged on the front face. A mounting ball is magnetically joined to the base. A microcontroller is electrically coupled to the green lighted button, the yellow lighted button, and the red lighted button. The microcontroller is programmed with instructions to: receive a communication from a second visual warning assembly. Then, engage one member of a lighted button set consisting of the red button, the yellow button, and the green button creating an indicating light. Finally, receiving a signal from a user making the indicating light an activated button.

4 Claims, 5 Drawing Sheets

(58) Field of Classification Search
CPC .......... H04N 7/181; H04N 7/183; G01C 9/12;
G01G 19/12; G07C 5/085
USPC ........ 340/425.5, 540, 573.1, 870.01, 870.18,
340/870.19, 870.24, 517, 521, 539.16
See application file for complete search history.

(56) References Cited

U.S. PATENT DOCUMENTS

| | | | |
|---|---|---|---|
| 2005/0043102 A1* | 2/2005 | Anderson | A63F 13/08 |
| | | | 463/49 |
| 2005/0162513 A1* | 7/2005 | Chan | G07C 5/085 |
| | | | 348/118 |
| 2011/0140913 A1* | 6/2011 | Montenero | G08B 21/0233 |
| | | | 340/870.07 |
| 2018/0151062 A1* | 5/2018 | Takagi | H01H 13/52 |
| 2021/0183244 A1* | 6/2021 | Malhan | B64D 47/08 |

* cited by examiner

VISUAL WARNING ASSEMBLY

RELATED APPLICATION

This application claims priority to provisional patent application U.S. Ser. No. 62/984,216 filed on Mar. 2, 2020, the entire contents of which is herein incorporated by reference.

BACKGROUND

Prior to embodiments of the disclosed invention, it was difficult for vehicle operators to signal one another. Embodiments of the disclosed invention solve this problem.

SUMMARY

A visual warning assembly is configured to make a warning from one vehicle to another vehicle. The visual warning assembly has a case further comprising a front face joined to a base and an antenna. A channel display window is arranged on the front face. A channel selector button is arranged on the front face. A power button arranged on the front face. A green lighted button is arranged on the front face. A yellow lighted button is arranged on the front face. A red lighted button is arranged on the front face. A mounting ball is magnetically joined to the base. A microcontroller is electrically coupled to the green lighted button, the yellow lighted button, and the red lighted button. The microcontroller is programmed with instructions to receive a communication from a second visual warning assembly. Then, engage one member of a lighted button set consisting of the red, the yellow button, and the green button creating an indicating light. Finally, receiving a signal from a user making the indicating light an activated button.

The yellow lighted button lights to make an indicating light and becomes an activated button. In some embodiments, a mounting arm further comprising a handlebar mount, joined to the mounting arm with a first ball joint. A case mount is joined to mounting ball with a second ball joint. A microcontroller is electrically coupled to the green lighted button, the yellow lighted button, and the red lighted button. A battery is electrically coupled to the microcontroller, and electrically coupled to a USB-C port in order to charge the battery. A power switch is electrically coupled to the microcontroller. A power indicator is electrically coupled to the microcontroller. A low range radio transceiver module is electrically coupled to the microcontroller.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
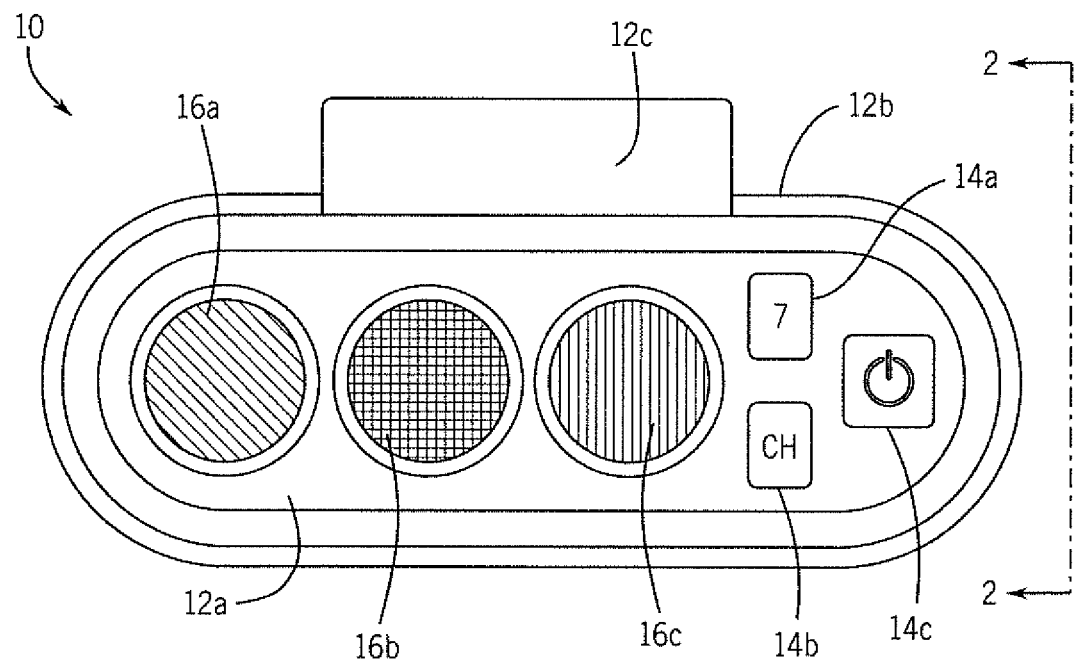
FIG. 1 shows a front elevation view of one embodiment of the present invention.
Figure 2:
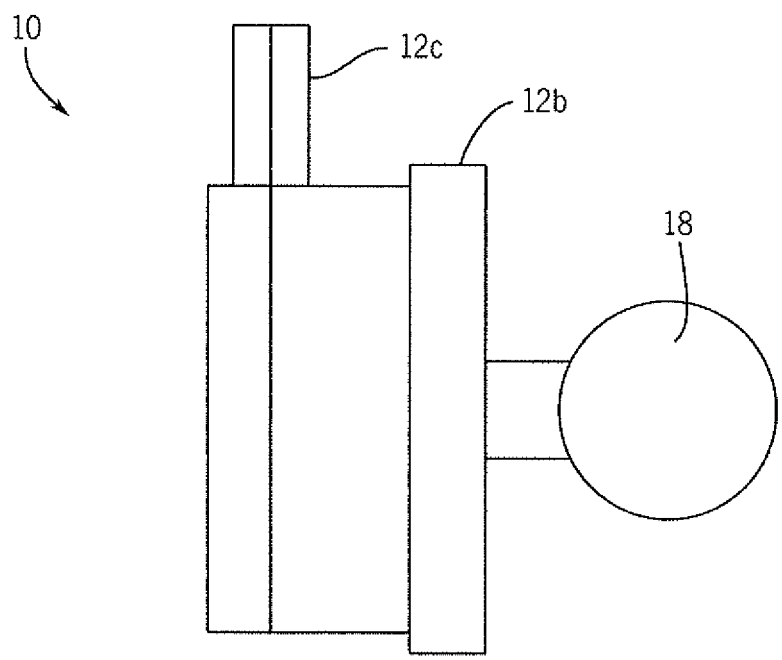
FIG. 2 shows a right side elevation view of one embodiment of the present invention.
Figure 3:
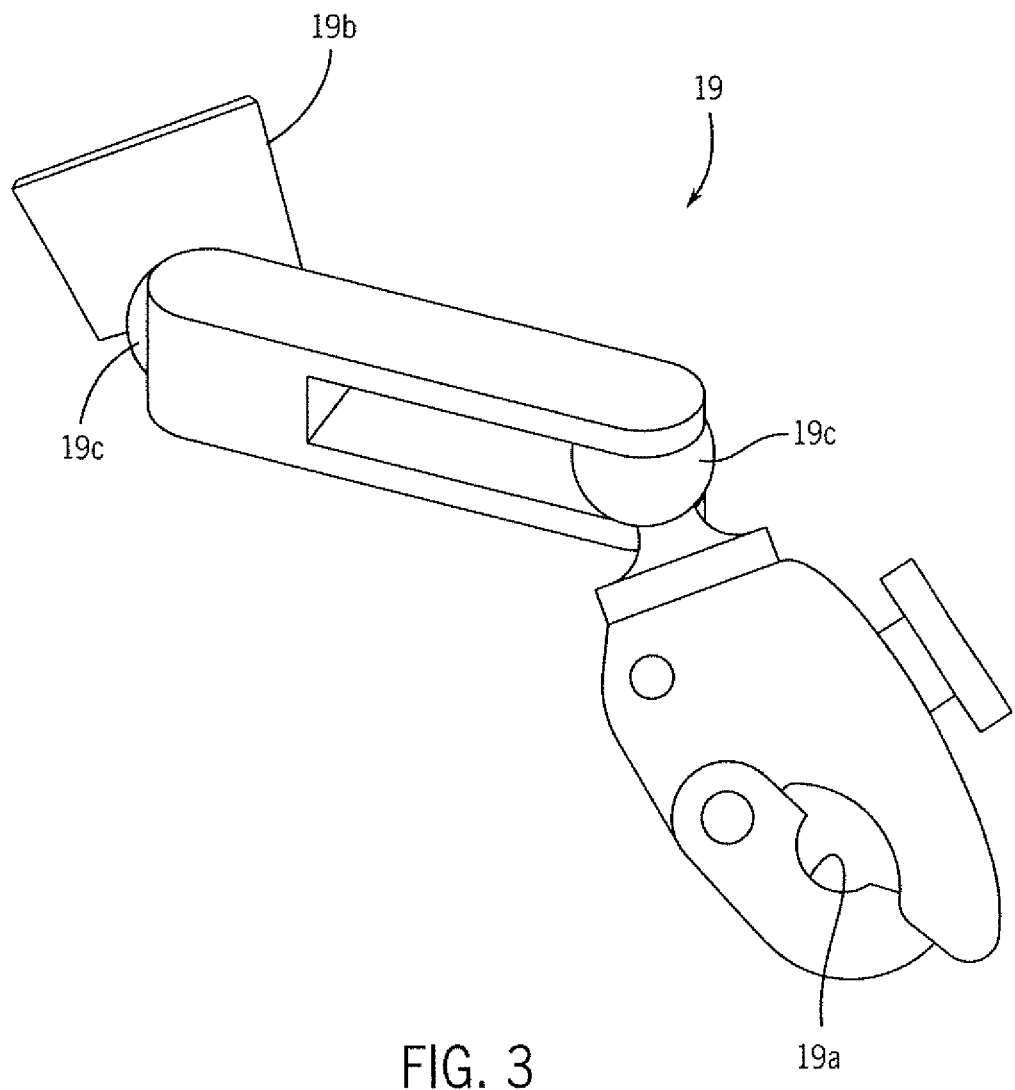
FIG. 3 shows a perspective view of one embodiment of the present invention.
Figure 4:
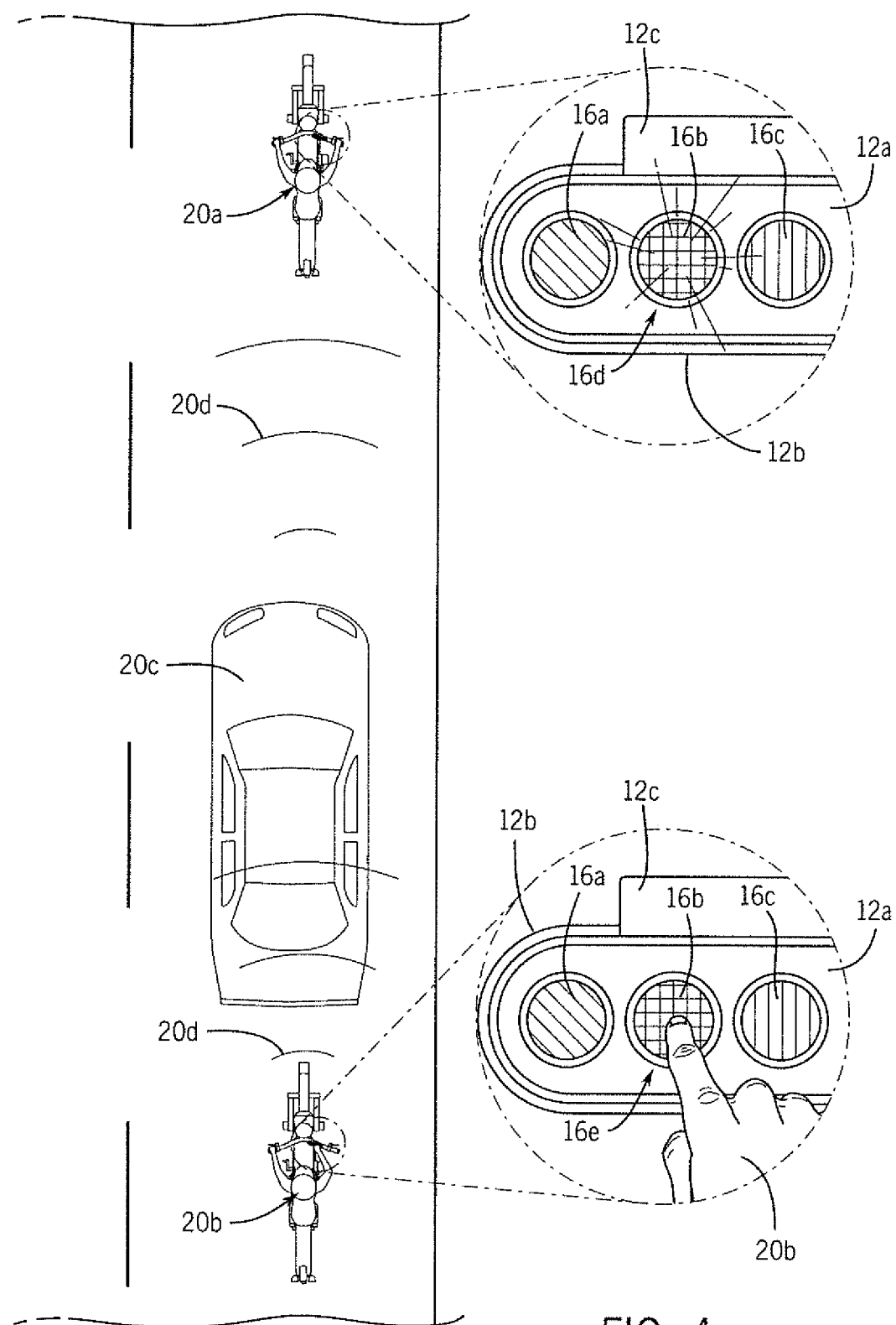
FIG. 4 shows a top plan schematic view of one embodiment of the present invention.
Figure 5:
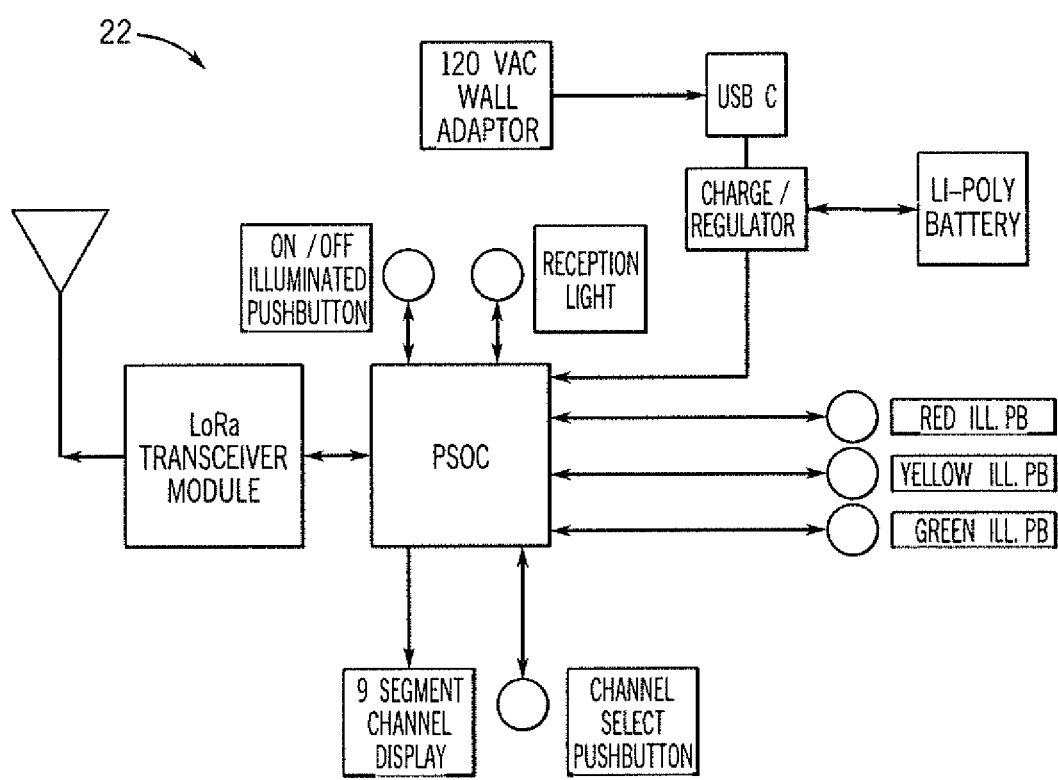
FIG. 5 shows a schematic view of one embodiment of the present invention.
Figure 8:
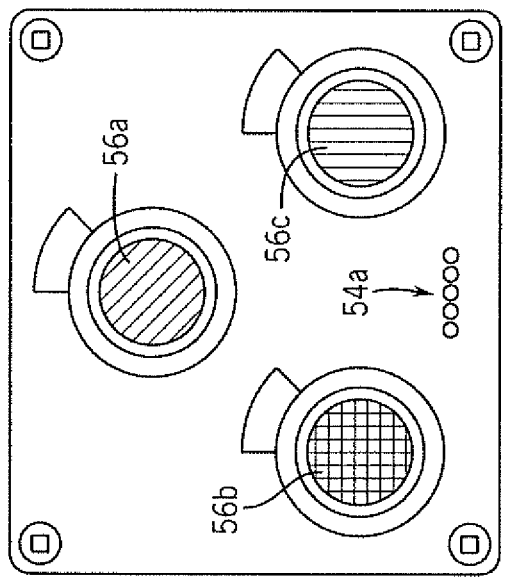
FIG. 8 shows a front elevation view of one embodiment of the present invention.
Figure 9:
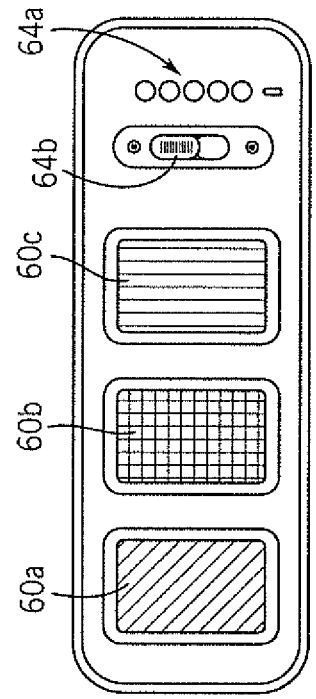
FIG. 9 shows a front elevation view of one embodiment of the present invention.
Figure 6:
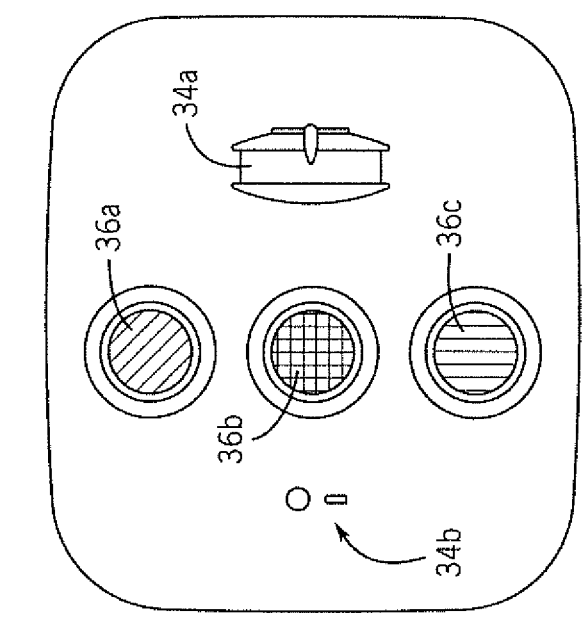
FIG. 6 shows a front elevation view of one embodiment of the present invention.
Figure 7:
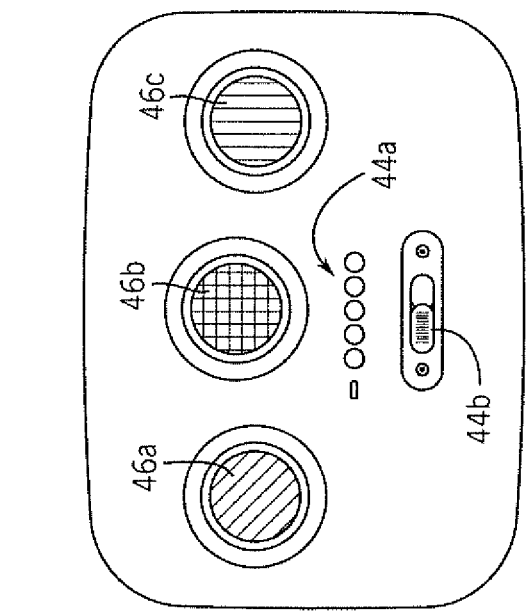
FIG. 7 shows a front elevation view of one embodiment of the present invention.

By way of example, and referring to FIGS. 1-9, a visual warning assembly 10 is configured to make a warning from one vehicle to another vehicle. The visual warning assembly 10 further comprises a case further comprising a front face 12*a* joined to a base 12*b* and an antenna 12*c*. A channel display window 14*a* is arranged on the front face 12*a*. A channel selector button 14*b* is arranged on the front face 12*a*. A power button 14*c* is arranged on the front face 12*a*. A green lighted button 16*a* is arranged on the front face 12*a*. A yellow lighted button 16*b* is arranged on the front face 12*a*. A red lighted button 16*c* is arranged on the front face 12*a*.

A mounting ball 18 is magnetically joined to the base 12*b*. A microcontroller is electrically coupled to the green lighted button, the yellow lighted button, and the red lighted button. The microcontroller 22 is programmed with instructions to receive a communication from a second visual warning assembly 20*b*. Then, engage one member of a lighted button set consisting of the red button 16*c*, the yellow button 16*b*, and the green button 16*a* creating an indicating light. Finally, receiving a signal from a user making the indicating light an activated button.

The yellow lighted button lights to make an indicating light and becomes an activated button. In some embodiments, a mounting arm 19 further comprising a handlebar mount 19*b* joined to the mounting arm 19 with a first ball joint 19*c*. A case mount 19*a* is joined to a mounting ball with a second ball joint 19*c*.

A microcontroller 22 is electrically coupled to the green lighted button 46*a*, 56*a*, 60*a*, the yellow lighted button 46*b*, 56*b*, 60*b*, the red lighted button 46*c*, 56*c*, 60*c*, a power indicator 34*b*, 44*a*, 54*a*, 64*a*, a power switch 44*b*, 64*b*. These can be in various configurations 40, 50, and 60.

A battery is electrically coupled to the microcontroller, and electrically coupled to a USB-C port in order to charge the battery. A power switch 44*b*, 64*b* is electrically coupled to the microcontroller 22. A power indicator 34*b*, 44*a*, 54*a*, 64*a*, is electrically coupled to the microcontroller 22. A low range radio transceiver module is electrically coupled to the microcontroller with a 9-channel selector 34*a*.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A visual warning assembly, configured to make a warning from one vehicle to another vehicle; the visual warning assembly comprising:
    a case further comprising a front face joined to a base and an antenna;
    a channel display window, arranged on the front face;
    a channel selector button, arranged on the front face;
    a power button, arranged on the front face;
    a green lighted button, arranged on the front face;
    a yellow lighted button, arranged on the front face;
    a red lighted button, arranged on the front face;
    a mounting ball, magnetically joined to the base;
    a microcontroller, electrically coupled to the green lighted button, the yellow lighted button, and the red lighted button; wherein the microcontroller is programmed with instructions to:
    receive a communication channel from a channel selector that matches a second communication channel on a second visual warning assembly;
    receive a communication from the second visual warning assembly;
    process the communication from the second visual warning assembly to engage one member of a lighted button set consisting of the red button, the yellow button, and the green button creating an indicating light;
    receiving a signal from a user making the indicating light an activated button.

2. The visual warning assembly of claim 1, wherein the yellow lighted button lights to make an indicating light and becomes an activated button.

3. The visual warning assembly of claim 2, further comprising: a mounting arm, further comprising:
    a handlebar mount, joined to the mounting arm with a first ball joint; and
    a case mount, joined to mounting ball with a second ball joint.

4. The visual warning assembly of claim 1, further comprising a microcontroller, electrically coupled to the green lighted button, the yellow lighted button, and the red lighted button;
    a battery, electrically coupled to the microcontroller, and electrically coupled to a USB-C port in order to charge the battery;
    a power switch, electrically coupled to the microcontroller;
    a power indicator, electrically coupled to the microcontroller; and
    a low range radio transceiver module, electrically coupled to the microcontroller.

* * * * *